United States Patent
Blomberg

[15] 3,684,775
[45] Aug. 15, 1972

[54] CHAIN TERMINATED POLYHEXAMETHYLENE ADIPAMIDE

[72] Inventor: Richard N. Blomberg, Wilmington, Del.

[73] Assignee: E. I. du Pont de Nemours and Company, Wilmington, Del.

[22] Filed: July 15, 1970

[21] Appl. No.: 54,930

[52] U.S. Cl. ............260/78 R, 260/72 N, 260/78 A, 264/210 F
[51] Int. Cl. .............................................C08g 20/20
[58] Field of Search................260/78 R, 78 A, 78 SC

[56] References Cited

UNITED STATES PATENTS

| | | | |
|---|---|---|---|
| 2,174,527 | 10/1939 | Peterson | 260/78 R |
| 2,688,011 | 8/1954 | Wheatley et al. | 260/78 R |
| 3,142,662 | 7/1964 | Hoffman | 260/78 R |
| 3,438,949 | 4/1969 | Crovatt | 260/78 R |
| 3,440,226 | 4/1969 | Crovatt et al. | 260/78 R |

OTHER PUBLICATIONS

Taylor, Journal of the American Chemical Society, Vol. 69, 1947, pp. 635–638.

*Primary Examiner*—Harold D. Anderson
*Attorney*—Sol Schwartz

[57] ABSTRACT

Filaments, having high tenacity, high initial modulus and low elongation-at-break, of poly(hexamethylene adipamide) having the recurring structural unit

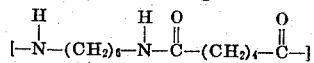

wherein the polymer chains are chain terminated with a radical selected from the group consisting of

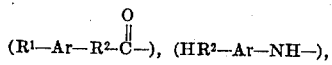

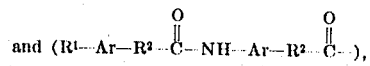

wherein Ar, $R^1$ and $R^2$ have the significance hereinafter defined, said radical comprising between about 0.35 and 2.0 mol percent of the total mols of iminohexamethyleneimino units

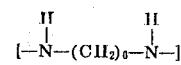

adipoyl units

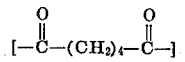

and radicals present in the polymer, said poly(hexamethylene adipamide) having a relative viscosity between about 15 and 35, measured as hereinafter described, are prepared.

4 Claims, 1 Drawing Figure

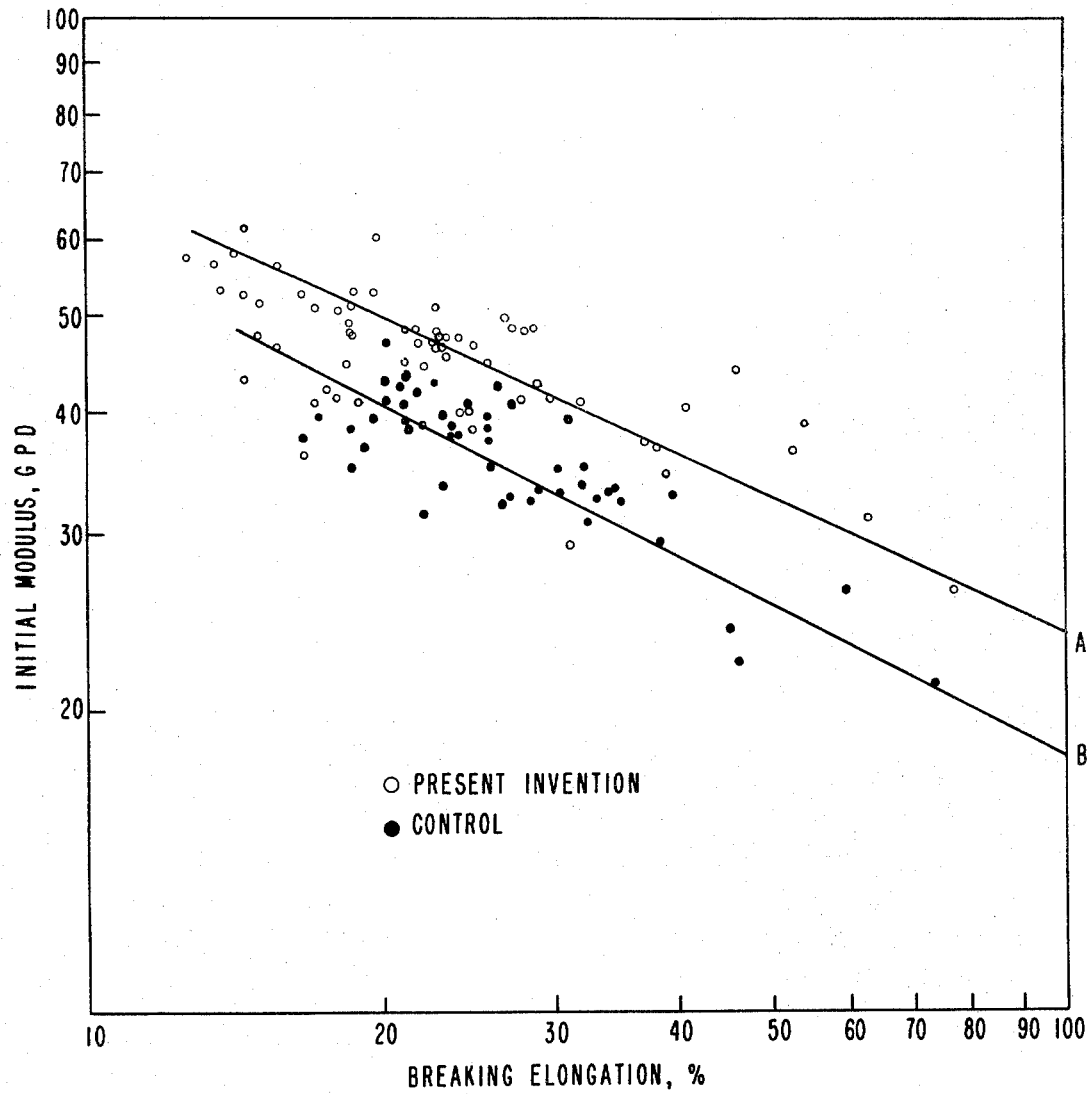

CHAIN TERMINATED POLYHEXAMETHYLENE ADIPAMIDE

This invention relates generally to poly(hexamethylene adipamide) and more particularly to poly(hexamethylene adipamide) having limited amounts of specified chain terminators.

BACKGROUND OF THE INVENTION

Poly(hexamethylene adipamide) exhibits a combination of properties that makes it suitable for a wide variety of end uses.

Filaments prepared from this polymer intended for use as industrial yarns should have high tensile properties. This objective has been attained by the use of very high molecular weight polymer. Such polymers have a much higher melt viscosity than normal polymers and display other characteristics that greatly increase the difficulty of extruding and drawing fibers at commercial speeds. Special techniques are needed for these processes and for post-drawing steps intended to give the maximum tensile properties.

The lower molecular weight polymers are less expensive to make and can be extruded and drawn much easier than the very high molecular weight polymers. It would be desirable to attain high tensile properties from a filament of these lower molecular weight poly(hexamethylene adipamide)s.

SUMMARY OF THE INVENTION

This invention provides a poly(hexamethylene adipamide) having the recurring structural unit $$[-\overset{H}{\underset{|}{N}}-(CH_2)_6-\overset{H}{\underset{|}{N}}-\overset{O}{\underset{||}{C}}-(CH_2)_4-\overset{O}{\underset{||}{C}}-]$$

wherein the polymer chains are preferably chain-terminated with a radical selected from the group consisting of

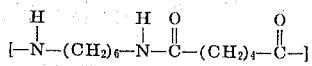

and $(R^1-Ar-R^2-\overset{O}{\underset{||}{C}}-NH-Ar-R^2-\overset{O}{\underset{||}{C}}-)$, wherein Ar represents a divalent aromatic radical, which may comprise two or more fused rings and which may contain substituents that are non-reactive during the polymerization process, $R^1$ represents hydrogen, an amino, or an imino ( = NH) radical, and $R^2$ represents a single bond or a divalent linear aliphatic hydrocarbon radical, with the proviso that an amino or imino ( = NH) radical is not located on a carbon atom adjacent to the carbon atom bearing $R^2$, said radical comprising between about 0.35 and 2.0 mol percent of the total mols of iminohexamethyleneimino units

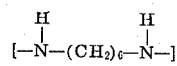

adipoyl units

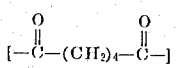

and radicals present in the polymer, said poly(hexamethylene adipamide) having a relative viscosity between about 15 and 35, measured as hereinafter described.

Any acid or amino acid containing a divalent aromatic hydrocarbon radical should be suitable as a chain-terminating radical precursor, with the proviso that the amino or imino radical is bonded directly to a carbon atom on an aromatic ring and $R^2$, having the above defined significance, is not located on a carbon atom adjacent to the one bearing an amino or imino radical.

This invention also provides a filament of the above poly(hexamethylene adipamide). This filament has a high initial modulus and a low elongation-at-break and exhibits little shrinkage at temperatures of about 160°C.

The filament products of this invention have an initial modulus of from 45 to 65 or more grams per denier with elongations at the break of from about 26 to 12 percent or less. Other preferred filaments have tenacities of from 8.5 to 10 or more grams per denier.

This invention also provides a shaped article of the above poly(hexamethylene adipamide).

DESCRIPTION OF DRAWINGS

The drawing illustrates the relationship between initial modulus and elongation-at-break exhibited by filaments of poly(hexamethylene adipamide) which are chain-terminated with radicals formed from p-aminobenzoic acid, p-aminophenyl acetic acid, 4-amino-4'-carboxybenzanilide and p-(p'-aminophenyl) benzoic acid (line A) and exhibited by filaments of poly(hexamethylene adipamide) which are not chain-terminated (line B). Each of the points shown represents an average value obtained from three trials. Lines A and B indicate an approximate average of the values represented by the points.

DESCRIPTION OF PREFERRED EMBODIMENT

Preparation of Polymer

Poly(hexamethylene adipamide) is prepared using adipic acid and hexamethylene diamine, either as the free acid and amine, or preferably, these monomers are prereacted to form a salt, i.e., hexamethylenediammonium adipate, which is added to the reaction vessel as an aqueous solution or dispersion. The chain terminated polymers of this invention are obtained by combining the desired chain terminator precursor with the monomer(s). Preferably, the mixture is heated under superatmospheric pressure in a sealed vessel such as an autoclave to avoid loss of reactants by evaporation. After several hours the pressure which develops is reduced to ambient and the polymerization is permitted to continue at a temperature above about 250°C. The water formed as a by-product of the polymerization reaction is converted to steam at the reaction temperature and may be partially displaced by nitrogen to achieve a higher molecular weight than would be attained under equilibrium conditions.

The relative amount of a given precursor employed in preparing the present polymers is a function of the concentration of aromatic chain terminators desired in the final product, the susceptibility of the precursor to decomposition during polymerization, and the conditions under which the polymerization reaction is performed. To illustrate, when the precursor is p-aminobenzoic acid, only as little as 10 percent or less of the amount initially added may react to produce the desired chain-terminator on the polymer chain. This precursor is therefore less useful than the preferred species disclosed hereinafter, since the latter produce nearly quantitative yields of the desired chain terminator.

A significant improvement in modulus of the filaments has been observed using as precursors amino acids that exhibit a variety of bridging groups between the carboxyl radical and the amine radical or acids with a variety of aromatic radicals. Several are exemplified hereinafter. It has been found, however, that a number of precursors are preferred, in that they provide a higher level of tensile properties than can be attained using other precursors of this invention. Preferred precursors include benzoic acid, phenyl acetic acid, p-aminophenyl acetic acid, 1-naphthylacetic acid, p-phenyl-benzoic acid, p-(p'-aminophenyl) benzoic acid, and 4-amino-4'-carboxylbenzanilide. The final polymer exhibits a relative viscosity of between about 15 and 35, measured as described hereinafter, which defines the range for the present products.

A poly(hexamethylene adipamide) that contains more than about 2.0 mol percent of aromatic chain-terminators, as calculated herein and a relative viscosity less than about 15 will not form continuous filaments with good tensile properties. When less than 0.35 mol percent of aromatic chain terminators are present, and the relative viscosity is greater than 35, drawing a filament of the polymer will not develop the higher modulus that characterizes the present products.

Due to the higher relative reactivities of aromatic acids when compared with aromatic amines, substantially all of the added aromatic chain-terminators react via the carboxyl groups; the carboxyl radicals that occur at the end of a polymer chain therefore are assumed to be derived from adipic acid.

The method of determining the amount of chain terminators present in a poly(hexamethylene adipamide) is described hereinafter.

FILAMENT PREPARATION

The modified polyamides of this invention are extrudable in filamentary form using conventional melt spinning techniques. If maximum initial modulus and tenacity and minimum elongation-at-break are desired, the filaments are drawn to the maximum degree consistent with good mechanical quality and freedom from breaks. The drawing may be accomplished in a single step process or a multiple step drawing operation such as described in U.S. Pat. No. 3,091,015, which provides a further increase in tenacity over the single step process. Preferably the filaments are drawn between about 5× and maximum at temperatures above about 150°C. to achieve an elongation-at-break of less than about 30 percent. The input speed to the drawing device, e.g., a heated plate or draw rolls, should be less than about 13 feet per minute on a 14 inch long hot plate to develop optimum tensile properties.

FILAMENT PROPERTIES

Filaments prepared as described above wherein the polymer exhibits the chain terminators of this invention can readily be processed to exhibit an elongation-at-break as low as 13.4 percent. The graph shown in the drawing illustrates the relationship between initial modulus and elongation-at-break, expressed in units of grams per denier and percent, respectively, for the present filaments and those which do not contain aromatic chain terminators. Each point represents an average obtained from three trials and the lines A and B approximate the average values obtained from values represented by these points for the modified and control filaments, respectively. The average values for initial modulus ($M_i$) of the modified filaments exceed those of control filaments in substantially all instances for a given value of elongation.

MEASUREMENTS

Relative viscosity ($\eta$rel) is the ratio of the flow time of an 8.4 weight percent solution of the polymer (in a 90 weight percent aqueous solution of formic acid) relative to the flow time of the solvent. Both flow times are measured with a viscosimeter at 25°C.

The number average molecular weight ($\bar{M}n$) of the polymer is calculated by the equation:

$$\log \bar{M}n = (\log (\eta\text{rel}) + 3.75/1.285)$$

The number of end groups for a given weight of polymer —e.g., Ag. is calculated by the expression: total end groups A grams = 2 × (A grams $\bar{M}n$).

The concentrations of carboxyl and aliphatic amine end groups are determined by a potentiometric titration of a solution of the polymer in a suitable solvent using non-aqueous solutions of potassium hydroxide and perchloric acid, respectively.

The difference between the total end groups (calculated from relative viscosity) and the sum of the carboxyl and aliphatic amine end groups (by analysis) both for the same weight of polymer is considered to be the number of aromatic end groups.

The mol percent of aromatic chain-terminating end groups is calculated as the mols of aromatic chain terminating end groups in a given weight of the polymer times 100 divided by the total mols of iminohexamethyleneimino units, adipoyl units and the aromatic chain-terminating end groups in the same weight of polymer.

The presence of aromatic end groups can be confirmed by well-known analytical methods. For example, aromatic amine and imine end groups ($H_2N—Ar—$, $HN = Ar—$) can be determined by reacting the polymer with p-dimethylaminobenzaldehyde which reacts to produce compounds known as Schiff bases. The relative concentration of Schiff base is then determined using comparative colorimetric photometry. It should be kept in mind that some of the aromatic amino acids may decarboxylate under the polymerization conditions so that the resulting aromatic amine acts as the terminator.

EXAMPLES

The following examples illustrate the preparation of the chain-terminated poly(hexamethylene adipamide) of this invention and the improvements observed when filaments of these chain-terminated polymers are compared with non-chain-terminated control polymers and chain-terminated polymers that are outside of the scope of the present invention.

EXAMPLE I

An evaporator is charged with 47 pounds (21 kg.) of an aqueous solution containing 22.3 pounds (10.1 kg.) of hexamethylenediammonium adipate and the solution is heated under atmospheric pressure to remove 8 pounds (3.6 kg.) of water. This solution is pumped into an autoclave, and 960 grams of powdered p-aminobenzoic acid are added with stirring. The autoclave is sealed, purged with nitrogen to remove air, and the contents are heated to 205°C. resulting in about 250 p.s.i. of pressure. Volatile materials are removed over a period of between 90 and 120 minutes during which the temperature increases to 240°C. The pressure is then reduced to atmospheric over a period of 90 minutes and the temperature is simultaneously increased to 275°C. These conditions are maintained for an additional 30 minutes after which time the polymer is extruded and cut into flake. The polymer exhibits a relative viscosity of 28, measured as described hereinbefore.

The polymer is molded into a plug at about 260°C. and then extruded as a monofilament through a 0.01 inch-diameter spinneret orifice using a spinneret temperature of 265°C. and a windup speed of 170 ft./minute. After being drawn 5.7 times the as-spun length over a plate heated at 190°C. using an input speed of 12.5 ft./minute, the resultant 11 denier filament exhibits an average tenacity of 10.0 g/denier, an elongation-at-break of 16.5 percent and an initial modulus of 52.5 g./denier.

Using endgroup analysis as described hereinbefore, the polymer is found to contain 1.13 mol percent of chain-terminators derived from p-aminobenzoic acid.

EXAMPLE II 500 cc. of a 49 weight percent aqueous solution of hexamethylenediammonium adipate is poured into 3,000 cc. of isopropyl alcohol with stirring and the precipitated salt is isolated and dried at 66°C. under reduced pressure for 16 hours. To 58 grams of this salt is added 0.0024 g. of manganese hypophosphite and 2.84 g. of p-aminobenzoic acid dimer (4-amino-4'-carboxybenzanilide). The resultant mixture is homogenized and placed in a thick-walled glass polymerization tube. After repeated cycles of flushing with nitrogen gas and evacuating, the tube is evacuated, sealed, and heated at 215°C. for 2 hours after which it is allowed to cool to ambient temperature. The tube is then opened and the contents powdered, placed in a second polymerization tube and heated for 3 hours at 283°C. under a flow of nitrogen. The polymer is then heated for 1.5 hours under a pressure of less than 1 mm. of mercury. The resultant polymer is removed from the polymer tube and subsequently molded into a plug at a temperature of about 260°C. The polymer exhibits a relative viscosity of 29.

The plug of polymer is extruded through a 0.01 inch-diameter spinneret orifice at a temperature of 253°C. using a pressure of 300 p.s.i. and wind-up speed of 100 ft./minute to obtain a monofilament of about 47 denier. When drawn to 5.6 times the as-spun length over a 14 inch-long hot plate heated to 190°C. using an input speed of 12.5 ft./minute, the filament exhibits an average denier of 8.3, a tenacity of 9.55 g./denier, an elongation-at-break of 19.6 percent and an initial modulus of 52.6 g./denier.

The polymer is found to contain 1.1 mol percent of chain terminators derived from p-aminobenzoic acid dimer.

The p-aminobenzoic acid dimer used in this example is prepared in the following manner. 100 grams of 4-nitro-4'-carboxybenzanilide in 500 cc. of N,N-dimethylacetamide is hydrogenated over a period of approximately 12 hours using Raney nickel catalyst, a hydrogen pressure of 500 p.s.i. and a temperature of 100°C. The catalyst is removed and water added to precipitate a product which is filtered, washed twice with water and dried at 66°C. in a vacuum oven. The resultant 4-amino-4'-carboxybenzanilide (p-aminobenzoic acid dimer) exhibits a melting point of 270°–271°C.

EXAMPLE III

Poly(hexamethylene adipamide) containing endgroups derived from p-aminobenzoic acid dimer is prepared using the same procedure as in Example II except that 5.68 g. of p-aminobenzoic acid dimer is employed.

The resultant polymer, which exhibits a relative viscosity of 16, is molded into a plug that is in turn extruded to form a monofilament using a 0.01-inch diameter spinneret orifice, a spinneret temperature of 268°C. and a windup speed of 310 ft./minute. The resultant 69 denier monofilament is drawn 7.3 times the original length over a 14-inch long hot plate heated to 180°C. using an input speed of 12.5 ft./minute. A drawn monofilament exhibits an average denier of 9.4, a tenacity of 8.4 g./denier, an elongation-at-break of 13.4 percent and an initial modulus of 56.4 g./denier.

EXAMPLE IV

Poly(hexamethylene adipamide) modified with p-aminophenylacetic acid is prepared using the procedure of Example II, except that 0.76 g. of p-aminophenylacetic acid is substituted for the p-aminobenzoic acid dimer and the reduced pressure cycle at 283°C. is eliminated.

The resultant polymer, which exhibits a relative viscosity of 31, is molded into a plug from which a monofilament is extruded through a 0.01-inch diameter spinneret orifice. A spinneret temperature of 275°C. and a windup speed of 325 ft./minute are employed. The resultant 31 denier monofilament is drawn seven times the as-spun length over a 14-inch long hot plate heated to 210°C. using an input speed of 12.5 ft./minute after which the monofilament exhibits an average denier of 5.1, a tenacity of 9.5 g./denier, an elongation-at-break of 18.5 percent and an initial modulus of 47.7 g./denier.

The polymer is found to contain 0.45 mol percent of chain terminators derived from p-aminophenylacetic acid.

EXAMPLE V

A modified polyamide is prepared as described in Example IV except that 1.09 g. of p(p'-aminophenyl) benzoic acid is substituted for the p-aminophenylacetic acid. The polymer exhibits a relative viscosity of 35.

The polymer is extruded using the procedure of Example IV with a spinneret temperature of 274°C., an extrusion pressure of 800 p.s.i. and a windup speed of 390 ft./minute to yield a 28 denier monofilament. After being drawn 6.5 times the as-spun length over a 14-inch long plate heated at 210°C. using an input speed of 12.5 ft./minute, the drawn monofilament exhibits an average denier of 4.3, a tenacity of 10.0 g./denier, an elongation-at-break of 17.8 percent and initial modulus of 50.1 g./denier.

The polymer contains 0.36 mol percent of chain terminators derived from p(p'-aminophenyl) benzoic acid.

EXAMPLE VI

A modified polyamide is prepared as in Example IV except that 0.618 g. of benzoic acid is substituted for the p-aminophenylacetic acid.

The resultant polymer, which exhibits a relative viscosity of 27, is extruded to form a monofilament using the procedure of Example IV. The spinneret temperature is 276°C., the pressure is 1,280 p.s.i. and the windup speed is 563 ft./minute. When drawn to the maximum over a plate heated at 210°C. the monofilament exhibits an average tenacity of 8.7 g./denier, an elongation-at-break of 20.6 percent and an initial modulus of 49.0 g./denier.

The polymer contains 1.30 mol percent of chain terminators derived from benzoic acid.

EXAMPLE VII

A modified polyamide is prepared as described in Example VI except that 0.69 g. of phenylacetic acid is employed as the precursor.

The resultant polymer, which exhibits a relative viscosity of 22, is extruded to form a monofilament as described in Example VI using a spinneret temperature of 270°C., a pressure of 320 p.s.i. and a windup speed of 660 ft./minute. When drawn to the maximum over a plate heated to 210°C., the monofilament exhibits an average tenacity of 8.2 g./denier, an elongation-at-break of 21.2 percent and an initial modulus of 47.4 g./denier.

The polymer contains 1.37 mol percent of chain terminators derived from phenylacetic acid.

EXAMPLE VIII

A modified polyamide polymer is prepared as described in Example VI using 0.946 g. of 1-naphthylacetic acid as the precursor.

The resultant polymer exhibits a relative viscosity of 19 and is extruded to form a monofilament as described in Example VI using a spinneret temperature of 275°C., a pressure of 800 p.s.i. and a windup speed of 480 ft./minute. When drawn to a maximum over a plate heated to 210°C. the monofilament exhibits an average tenacity of 7.7 g./denier, an elongation-at-break of 20.5 percent and an initial modulus of 55.2 g./denier.

The polymer contains 1.08 mol percent of chain terminators derived from 1-naphthylacetic acid.

EXAMPLE IX

A modified polyamide is prepared as described in Example VI using 0.985 g. of 4-biphenylcarboxylic acid as the precursor. The polymer exhibits a relative viscosity of 21.

A monofilament is extruded as in Example VI using a spinneret temperature of 274°C., a pressure of 1,120 p.s.i. and a windup speed of 600 ft./minute. When drawn to a maximum over a plate heated to 210°C., the filament exhibits an average tenacity of 8.6 g./denier, an elongation-at-break of 15.2 percent and initial modulus of 64.6 g./denier.

A polymer prepared in a similar manner contains 0.90 mol percent of chain terminators derived from the precursor.

EXAMPLE X

A polyamide is prepared as described in Example II using an aqueous solution containing 58 g. of hexamethylenediammonium adipate without the addition of a precursor. The solution is heated for 1 hour at 218°C. while maintaining a flow of nitrogen over the polymer, followed by heating for 1 hour at 283°C. under a pressure of less than 1 mm. of mercury.

The polymer which exhibits a relative viscosity of 23 is extruded to form a monofilament using the procedure of Example II, a spinneret temperature of 283°C., a pressure of 1,280 p.s.i. and a windup speed of 310 ft./minute. After being drawn to a maximum over a plate heated to 190°C., the filament exhibits an average tenacity of 7.3 g./denier, an elongation-at-break of 20 percent and an initial modulus of 41.2 g./denier.

EXAMPLE XI

Unmodified poly(hexamethylene adipamide) prepared as in Example I, except without the addition of p-aminobenzoic acid, exhibits a relative viscosity of 45.

This polymer is extruded as a monofilament using the procedure of Example II, a spinneret temperature of 290°C., a pressure of 1,600 p.s.i. and a windup speed of 195 ft./minute. A filament drawn to the maximum over a plate heated to 190°C. using an input speed of 12.5 ft./minute exhibits an average tenacity of 9.2 g./denier, 21.5 percent elongation-at-break, and 41.9 g./denier initial modulus.

EXAMPLE XII

This example demonstrates the low tensile properties of fibers that are outside the scope of the present invention.

A 76 g. sample of poly(hexamethylene adipamide) modified with p-aminobenzoic acid is prepared using 9 parts by weight of hexamethylene diammonium adipate and 1 part by weight of para-aminobenzoic acid. The polymer and precursor are well mixed and heated under nitrogen at 220°C. for one-half hour, followed by a raising of the temperature to 280°C. during one-half hour. The temperature is maintained at that value for a further hour. Then the pressure is reduced to an absolute pressure of 2 mms. of mercury and heating is continued at 280°C. for a further hour.

The polymer sample, which exhibits a relative viscosity of 13.1, is molded into a plug and extruded as a melt at a temperature of 260°C. through a 0.01-inch (0.03 cm.) diameter spinneret orifice. The resultant fiber is too weak to be wound on a bobbin as a continuous length. Samples of fiber are oriented by drawing them over a hot plate. A 34.2 denier sample exhibits a tenacity, elongation-at-break and initial modulus of 2.59 g./denier, 23.7 percent and 22.7 g./denier, respectively.

A polymer prepared in a manner similar to the foregoing exhibits 2.4 mol percent of chain-terminators derived from p-aminobenzoic acid and exhibits a relative viscosity of 12.5. The procedure employed to prepare the polymer differed from the foregoing in that the initial heating was carried out at 220°C. for 1 hour instead of for one-half hour.

What is claimed is:

1. A poly(hexamethylene adipamide) having the recurring structural unit

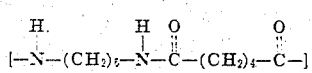

wherein the polymer chains are chain-terminated with

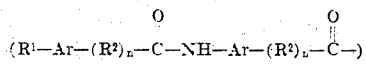

wherein Ar represents a divalent aromatic carbocyclic radical and any substituents thereon being non-reactive during the polymerization process, $R^1$ represents hydrogen, amino, or an imino (= NH) radical, and $R^2$ represents a divalent linear aliphatic hydrocarbon radical and $n$ is 0 or 1 with the proviso that an amino or imino (= NH) radical is not located on a carbon atom adjacent to the carbon atom bearing $R^2$, said radical comprising between about 0.35 and 2.0 mol percent of the total mols of iminohexamethylene imino units

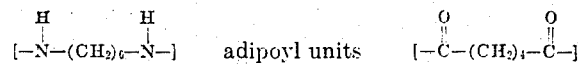

and chain-terminating radicals present in the polymer, said poly(hexamethylene adipamide) having a relative viscosity between about 15 and 35, measured at 25°C. using an 8.4 percent by weight solution of the polymer in a 90 percent by weight aqueous solution of formic acid.

2. A poly(hexamethylene adipamide) as recited in claim 1 wherein said radical comprises between about 0.35 and 1.5 mol percent of the total mols present in the polymer.

3. A poly(hexamethylene adipamide) as recited in claim 1 wherein the polymer chains are chain terminated with

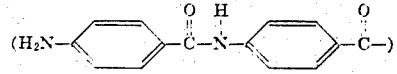

4. A filament of said poly(hexamethylene adipamide) recited in claim 1.

* * * * *